United States Patent
Stroud et al.

(10) Patent No.: US 8,768,494 B1
(45) Date of Patent: Jul. 1, 2014

(54) SYSTEM AND METHOD FOR GENERATING POLICY-BASED AUDIO

(75) Inventors: Micah S. Stroud, San Jose, CA (US); Stephen G. Holmes, Seattle, WA (US); Edward L. Riegelsberger, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1699 days.

(21) Appl. No.: 10/744,678

(22) Filed: Dec. 22, 2003

(51) Int. Cl.
*G06F 17/00* (2006.01)

(52) U.S. Cl.
USPC .......................................................... 700/94

(58) Field of Classification Search
USPC .......... 381/310, 17, 18, 107; 700/94; 704/221
See application file for complete search history.

(56) References Cited

U.S. PATENT DOCUMENTS

| | | | |
|---|---|---|---|
| 3,173,022 A | 3/1965 | Kunsch, Jr. | |
| 5,434,926 A * | 7/1995 | Watanabe et al. | 381/108 |
| 5,815,689 A | 9/1998 | Shaw et al. | |
| 5,873,354 A | 2/1999 | Krohn et al. | |
| 5,875,354 A | 2/1999 | Charlton et al. | |
| 5,918,073 A | 6/1999 | Hewitt | |
| 6,005,901 A | 12/1999 | Linz | |
| 6,226,758 B1 | 5/2001 | Gaalaas et al. | |
| 6,260,011 B1 | 7/2001 | Heckerman et al. | |
| 6,292,854 B1 | 9/2001 | Priem | |
| 6,996,445 B1 * | 2/2006 | Kamijo | 700/94 |
| 7,216,221 B2 * | 5/2007 | Bear et al. | 713/1 |
| 7,348,483 B2 * | 3/2008 | Puryear | 84/645 |
| 7,376,475 B2 * | 5/2008 | Fay et al. | 700/94 |
| 7,574,274 B2 | 8/2009 | Holmes | |
| 7,983,772 B2 | 7/2011 | Holmes | |
| 2002/0012324 A1 | 1/2002 | Hayward | |
| 2002/0107594 A1 * | 8/2002 | Taylor et al. | 700/94 |
| 2004/0071132 A1 | 4/2004 | Sundqvist et al. | |
| 2004/0161126 A1 * | 8/2004 | Rosen et al. | 381/307 |
| 2004/0264714 A1 * | 12/2004 | Lu et al. | 381/104 |

FOREIGN PATENT DOCUMENTS

| | | |
|---|---|---|
| EP | 0869443 | 10/1998 |
| TW | 481782 | 10/2000 |
| WO | 02052240 | 7/2002 |

OTHER PUBLICATIONS

Analog Devices, Inc. "192 kHz Stereo Asynchronous Sample Rate Converter" AD1895—Specifications, Sep. 2002, XP002340804 Norwood, MA, USA.
Young M., "A Digital Audio Production System" Broadcasting Convention, 1995. IBC 95, International Amsterdam, NL, London, UK, IEE, UK, 1995, pp. 202-207, XP006528928 ISBN: 0-85296-644-X, the whole document.
Nvidia; Featured Technology Nvidia nForce Platform Processors; 2 pages; http://www.nvidia.com/object/nppa.html, Feb. 15, 2004.
Nvidia; Featured Technology Audio Processing Unit (APU); 2 pages; http://www.nvidia.com/object/apu.html, Feb. 15, 2004.

(Continued)

*Primary Examiner* — Andrew C Flanders

(57) ABSTRACT

Embodiments of the invention provide a policy-based audio system. The system includes a sound application protocol interface, a configuration module and a speaker driver. The sound application protocol interface receives a set of sound samples generated by an application or event. The configuration module retrieves a first group of one or more parameters, rules and priorities applicable to the application or event. The speaker driver produces an audio output by processing the set of sound samples as a function of the group of one or more configuration parameters, rules and priorities.

7 Claims, 5 Drawing Sheets

(56) References Cited

OTHER PUBLICATIONS

Nvidia; Featured Technology; Nvidia SoundStorm; 2 pages; http://www.nvidia.com/object/feature.sub.--soundstorm.html, Feb. 15, 2004.

Nvidia; Featured Technology Digital Media Gateway; 2 pages http://www.nvidia.com/object/feature.sub.--dmg.html, Feb. 15, 2004.

Intel: Intel 875P Chipset; 2 pages; http://www.intel.com/design/chipsets/875P/index.htm, Feb. 4, 2004.

Nvidia; Nvidia's New Motherboard Chipset; 3 pages; http://www.pcquest.com/content/technology/101071401.asp, Feb. 15, 2004.

Nvidia; Technical Brief Nvidia nForce Platform Processing Architecture; 2001; 9 pages; www.nvidia.com.

Nvidia; Technical Brief Nvidia nForce Platform Processors Audio Processing Unit; 2002; 10 pages; www.nvidia.com.

Nvidia; Technical Brief Nvidia nForce2 MCP-T Digital Media Gateway; 2002; 9 pages; www.nvidia.com.

* cited by examiner

SYSTEM AND METHOD FOR GENERATING POLICY-BASED AUDIO

FIELD OF THE INVENTION

Embodiments of the present invention relate to audio systems, and more particularly to a policy-based audio system.

BACKGROUND OF THE INVENTION

Currently, sounds generated by each application running on a computing device (e.g., personal computer) are played over each other. No sound is more important than another when played. Therefore, sound from one application may make it more difficult for a user to hear sound from an application of particular interest to the user. For instance, an alarm may not be over a music application playing a song.

Furthermore, each application may generate sound in one of a number of different formats. The hardware configuration, however, may be optimized to play sound in a particular format. Currently, there is no ready means for converting the format of sounds generated by particular application into a format that matches the hardware configuration, while not applying the conversion algorithm to sounds already generated in the matching format.

SUMMARY OF THE INVENTION

Embodiments of the invention provide a system and method for generating policy-based audio for an electronic computing device. One embodiment of the invention provides a policy-based audio system that includes a device driver communicatively coupled to a sound application protocol interface. The system further includes a policy manager communicatively coupled to the device driver. The policy-based audio system also includes a configuration module communicatively coupled between the policy manager and an audio system database. In one embodiment, the computing device is a computer system running applications.

Another embodiment of the invention provides a computer-implemented method of generating policy-based audio output. The audio policy may assign audio priority to applications running on the system and/or system events. According to the audio priority associated with an application or event, its volume may be adjusted relative to other sounds from other applications and/or events. The method includes receiving a set of sound samples from an application and/or operating system (e.g., event generator). A priority applicable to the application and/or event generating the set of sound samples is retrieved. The sound samples are processed according to the priority applicable to the application and/or event. The processed sound samples are then played.

Another embodiment of the invention provides a system for generating policy-based audio output. The system includes a sound application protocol interface, a configuration module and a speaker driver. The sound application protocol interface receives a set of sound samples generated by an application. The configuration module retrieves a first group of one or more parameters, rules and priorities applicable to the application. The speaker driver produces an audio output by processing the set of sound samples as a function of the group of one or more configuration parameters, rules and priorities.

Embodiments of the invention also provide a method for generating configuration parameters (e.g., stereo format, multi-channel format and the like), rules (play, mute, solo and the like), position in 3D space (off to the left, behind the user, and the like) and/or priorities (e.g., high, medium, low and the like) applicable to common applications (e.g., music players, games and the like). Embodiments of the invention also provide a method for a user to specify and/or modify configuration parameters, rules and/or priorities applicable to a given application or event. These parameters may be established through user interaction with a graphical user interface.

Accordingly, embodiments of the invention readily enable a sound generated in a first encoding method (e.g., stereo format) to be played in a second encoding method (e.g., surround sound format) based upon one or more configuration parameters associated with the application or event that generates the sound. Embodiments of the invention may enable setting a global process for automatically converting the encoding method of the sound based upon one or more configuration parameters. Embodiments of the invention may advantageously mute or position a selected application or event from playing any sound, or play sound from one application or event to the exclusion of sounds generated by other applications, based upon one or more rules associated with the applications and/or events that generate the sounds. In addition, embodiments of the invention may advantageously position or volume duck sounds generated by one or more applications and/or events relative to one or more other applications and/or events, based upon one or more audio priorities associated with the applications and/or events that generate the sounds. Hence, embodiments of the invention advantageously apply various audio signal processing to sounds on a per-application or event basis.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the invention may be practiced without these specific details. In other instances, well-known methods, procedures, components, and circuits have not been described in detail as not to unnecessarily obscure aspects of the invention.

Figure 1:
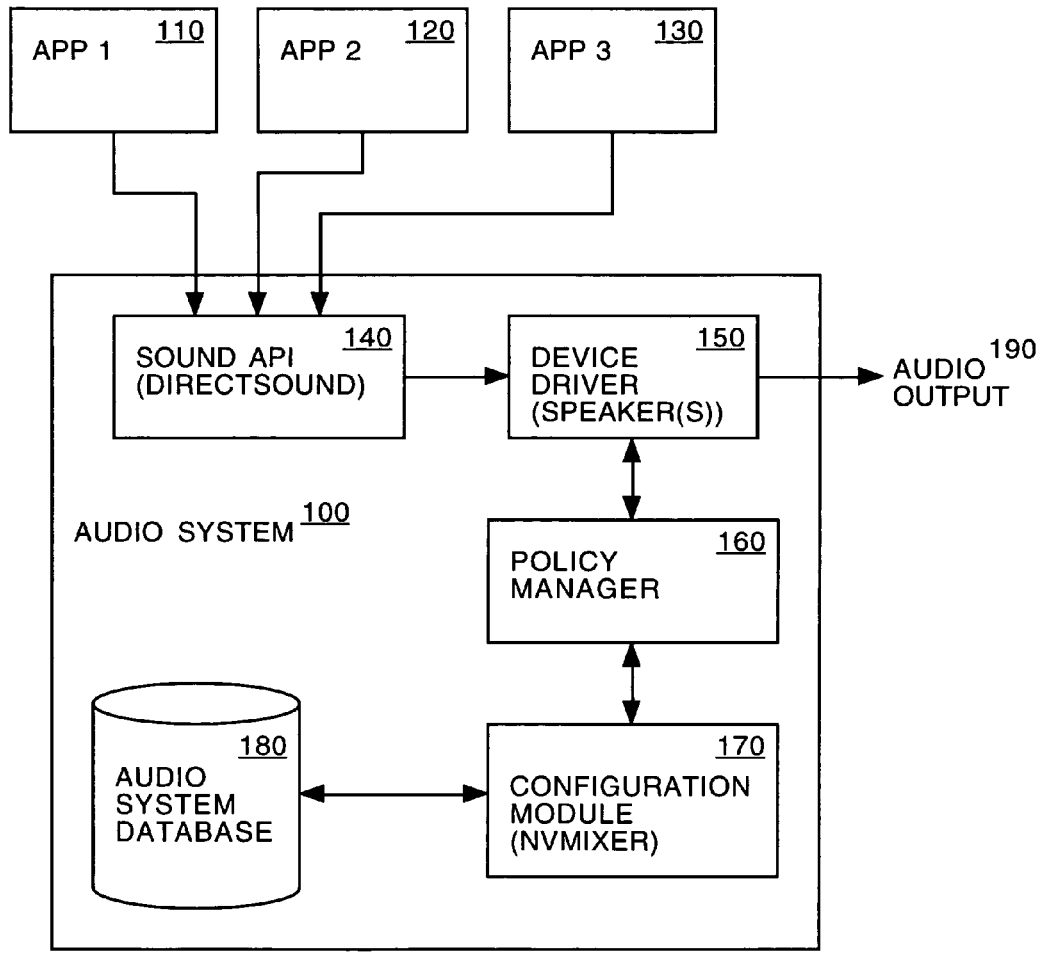
FIG. 1 shows a block diagram of an audio system, in accordance with one embodiment of the present invention.

Referring to FIG. 1, a block diagram of an electronic audio system, in accordance with one embodiment of the invention, is shown. The platform for such a system may be a computer system or similar electronic device that is capable of making sound (e.g., a game console, smart phone, personal digital assistant and the like). As depicted in FIG. 1, the electronic audio system 100 includes a sound application programming interface (API) 140, a device driver (e.g., speaker driver, sound card driver, videocard driver or the like) 150, a policy manager 160, a configuration module 170 and an audio system database 180. The policy manager basically checks the audio system database 180 to see what the device driver 150 should do with sound received from each application 110-130 or event.

One or more applications 110-130 and the operating system are communicatively coupled to the sound API 140. The sound API 140 receives sets of sound samples from one or more of the applications 110-130 or events (e.g., operating system) at any given time. The sound API 140 is communicatively coupled to the device driver 150. The sound API 140 provides a high-level interface by which an application 110-130 or event can make requests of the device driver 150. In an exemplary implementation, the sound API 140 may be DIRECTSOUND for the WINDOWS operating system available from Microsoft of Redmond, Wash. The device driver 150 is a program routine that contains machine language necessary to render the set of sound samples requested by each application and/or event 110-130. Accordingly, the device driver 150 generates an audio output 190 for driving a soundcard, speakers or the like hardware. The audio output 190 includes one or more sets of sound samples processed according to one or more configuration parameters, rules and/or priorities associated with the application or event that generated the particular set of sound samples.

In one embodiment, the policy manager 160 is communicatively coupled to the device driver 150. In another embodiment, the policy manager 160 is implemented as an integral part of the device driver 150. In yet another embodiment, the policy manager 160 is implemented as an integral part of the configuration module 170. In yet another embodiment, the functions of the device driver 150, the policy manager 160 and configuration module 170 are implemented as a single programming routine. The sound API 140, device driver 150, policy manager 160, configuration module 170 and audio system database 180 typically execute as one or more background tasks.

The policy manager 160 in accordance with the present invention is a program routine for causing the device driver 150 to apply one or more applicable configuration parameters, rules and/or priorities to the corresponding set of sound samples generated by each application 110-130 and/or event. The configuration module 170 of FIG. 1 is communicatively coupled to the policy manager 160. The configuration module 170 is a program routine for specifying parameters applicable to configuring the audio system 100. The configuration module also enables specification of rules and priorities applicable to the applications and/or events 110-130 that generate sound. In an exemplary implementation, the configuration module may be NVMIXER available from Nvidia of Santa Clara, Calif.

In one embodiment, fuzzy logic in the configuration module 170 applies one or more configuration parameters, rules and/or priorities to applications that generate sound based upon each particular application's class. The fuzzy logic utilizes a knowledge base and inference engine to determine, based upon the class of a particular application, what system defined configuration parameters, rules and/or priorities should be applied to sound generated by the application or event. In another embodiment, the configuration module 170 provides a graphical user interface for specifying configuration parameters, rules and/or priorities by a user. The configuration parameters, rules and priorities may be established on a per-application or event basis. Generation of configuration parameters, rules and/or priorities may be provided upon installation of the audio system 100, upon installation of an application 110-130, driver and/or hardware, and/or upon initiation by a user. Generation of configuration parameters, rules and/or priorities may also be provided upon detection of an application or event generating sound for the first time. This may be effected by the automatic display of a graphical user interface for receiving user entered configuration parameters, rules and priorities for a given application or event. In addition, configuration parameter, rules and/or priorities may also be pre-defined for one or more applications and/or events. The configuration parameters, rules and priorities are stored in an audio system database 180, which is communicatively coupled to the configuration module 170.

Upon receipt of a sound by the device driver 150, the name of the application 110-130 or event playing the sound is passed by the device driver 150 or sound API 140 to the policy manager. The policy manager 160 passes the name of the application 110-130 or event playing the sound to the configuration module 170 and causes the configuration module 170 to query the audio system database 180. In response to the query, the configuration module 170 returns the configuration parameters, rules and/or priorities applicable to the particular application 110-130 or event generating the sound. Thereafter, the policy manager 160 causes the device driver 150 to apply the corresponding applicable configuration parameters, rules and/or priorities when processing each set of sound samples.

For example, a configuration parameter may specify that a particular application generates sound in a first format (e.g., stereo) and that the hardware is configured to play sound in a second format (e.g., surround sound). The configuration parameter may also specify a particular signal-processing algorithm (e.g., 3D positioning, cloning and/or up-channel conversion) to automatically convert from the first format to the second format. In addition, a rule associated with the particular application may specify that its sound is always played, while sound from another application is always muted. Furthermore, a priority associated with the particular application may specify that the sound from such application is always played at full strength, while sound from all other applications are partially or substantially reduced (e.g., ducked), depending on the relative priorities of the applications generating the sound.

Figure 2:
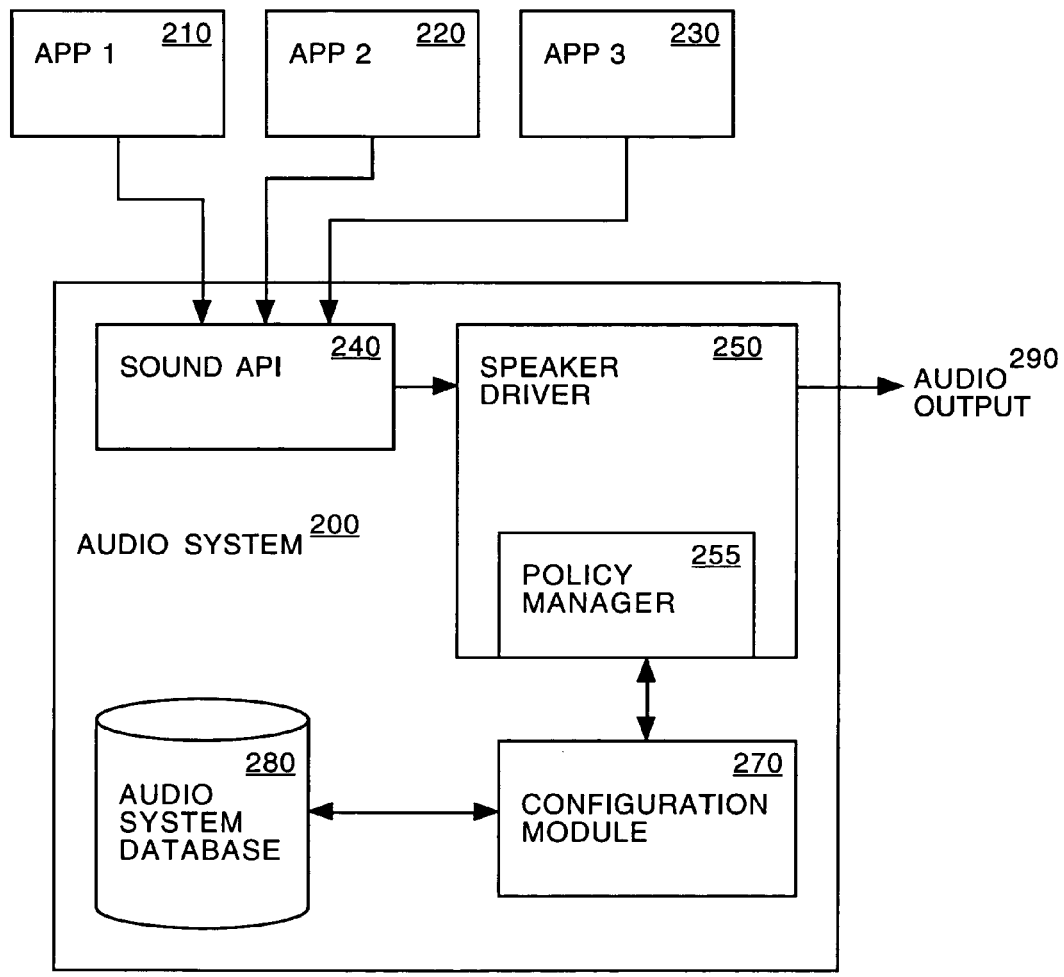
FIG. 2 shows a block diagram of an audio system, in accordance with another embodiment of the present invention.

Referring now to FIG. 2, a block diagram of an electronic audio system, in accordance with another embodiment of the invention, is shown. As depicted in FIG. 2, the electronic audio system 200 includes a sound application programming interface (API) 240 a speaker driver 250, a configuration module 270 and an audio system database 280. The speaker driver 250 includes a policy manager 255. Alternatively, the policy manager 255 may be included in the configuration module 270.

The sound API 240 receives one or more sets of sound samples generated by the applications 210-230 and/or events, at any given time. The sound API 240 provides a high-level interface by which each application or event 210-230 makes a request of the speaker driver 250 to play its set of sound samples. The policy manager 255 of the speaker driver 250 passes the name of the application playing the sound samples to the configuration module 270.

The configuration module 270 retrieves a group of configuration parameters, rules and/or priorities applicable to each application or event 210-230. More specifically, the policy manager 255 then causes the configuration module 270 to query the audio system database 280 to determine one or more configuration parameters, rules and/or priorities applicable to the given application or event (e.g., 210). All of the configuration parameters, rules and/or priorities stored in the audio system database 280 are searched to determine those that are applicable to the given application or event (e.g., 210) generating the set of sound samples. The configuration module 270 returns to the policy manager 255 the configuration parameters, rules and/or priorities, applicable to each set of sound samples.

The speaker driver 250 produces an audio output 290 as a function of the sets of sound samples and the group of configuration parameters, rules and/or priorities applicable to each application or event 210-230. More specifically, the policy manager 255 causes the speaker driver 250 to process each set of sound samples according to the associated configuration parameters, rules and/or priorities. The audio output 290 includes the one or more sets of sound samples processed according to the configuration parameters, rule and/or priorities associated with the particular application or event 210-230 that generated each corresponding set of sound samples.

The configuration module 270 also provides for system generation and/or user specification of configuration parameters, rules and/or priorities upon installation of the policy-based audio system 200, upon installation of an application driver and/or hardware, and/or upon initiation by a user. The configuration module 270 may include fuzzy logic for associating system defined configuration parameters, rules and/or priorities to a given application or event 210-230. The configuration parameters, rules and/or priorities may be associated by the fuzzy logic based upon the class of the new application or event.

The configuration module 270 may also provide a user interface for specification of configuration parameters, rules and/or priorities and their association to a given application or event 210-230. The user interface may also allow a user to modify configuration parameters, rules and/or priorities and their associations created by fuzzy logic and/or previously specified by the user.

For each set of sound samples received by the speaker driver 250, the policy manager 255 may also determine if the set of sound samples has been generated by an application or event that has not previously produced sound (e.g., new application). If the set of sound samples are from a new application or event, the configuration module 270 may generate one or more configuration parameters, rules and/or priorities based upon the class of the new application or event. An exemplary set of classes may include: 1) system status events; 2) messaging applications; 3) gaming applications, music player applications and video player applications; 4) word processing applications, database applications and spreadsheet applications. The generated configuration parameters, rules and/or priorities are stored in the audio system database 280, such that their relationship to the corresponding application or event is maintained. Alternatively, default (e.g., pre-set) configuration parameters, rules and/or priorities may be associated with the current and future sets of sounds generated by the new application or event.

An exemplary configuration parameter may specify that an application generates sound in a stereo format and that the attached speakers are configured to play sounds in a surround sound format. Another configuration parameter may therefore specify a signal-processing algorithm for generating front right and left, back right and left, and center channels. Yet another configuration parameter would allow an applications' sound to be positioned somewhere in 3D space relative to the priority (further away from the user for lower priority, for example) assigned that application.

An exemplary rule (e.g., play) may specify that whenever a first application is running it is able to play sounds. Another exemplary rule (e.g., mute) may specify that no sounds are ever played from a second application. Yet another rule (e.g., solo) may specify that sounds from all other applications are muted and only a third application is able to play sounds.

A first exemplary priority (e.g., highest) may specify that sound from a first application trumps sound from all other applications. Thus, sound from the first application is played at approximately 100% of available volume. A second priority (e.g., medium) may specify that sound from a second application is played at full volume unless sound from a first priority application is also being played. If sound from a first priority application is also being played, the sound from the second application is played at approximately 80-95% of the available volume. A third priority (e.g., low) may specify that sound from a third application is played at full volume unless sound from a first or second priority application is being played. If sound from a first and/or second priority application is being played, the sound from the third application is played at approximately 30-70% of the available volume.

If a play rule is associated with the first and second application and a solo rule is associated with the third application, then the sets of sound samples from the third application are played at full volume and the sets of sound from the first and second applications are muted while sets of sounds from the third application are being played.

If multiple applications having the same priority associated with them are generating sound at the same time, the "last run" application may be played at a slightly higher volume than the others. If an application is rapidly "closing and opening sound", a specified delay may be allowed to pass before the volume level of sounds generated by other application are restored. Alternatively, a delay before volume ducking occurs may be set.

In an exemplary implementation, a music player application is currently generating a first set of sound samples (e.g., music). An instant message is then received, which causes a messaging application to generate a second set of sound samples (e.g., receipt notification chime). The policy manager causes the device driver to duck a portion of the first set of sound samples (e.g., volume level is decreased to approximately 95%) generated by the music player and plays the second set of sound samples from the messaging application at full volume. Therefore, the user can hear the music, but it is not over-powering the sound being played from the messaging application. After the second set of sound samples from the messaging application are done being played, the remaining portion of the first set of sound samples from the music player are played at full volume.

If a third application thereafter begins generating a third set of sound samples, the policy manager determines the priority of the sound from the third application. If the new sound has the same or lower priority (e.g., medium) as the music player, than the new sound is also ducked with respect to the sound from the messaging application. If the new sound has a higher priority than the sound from the messaging application, sound from the music player may be further ducked or even muted and the sound from the messaging application is also ducked with respect to the new sound.

Figure 3:
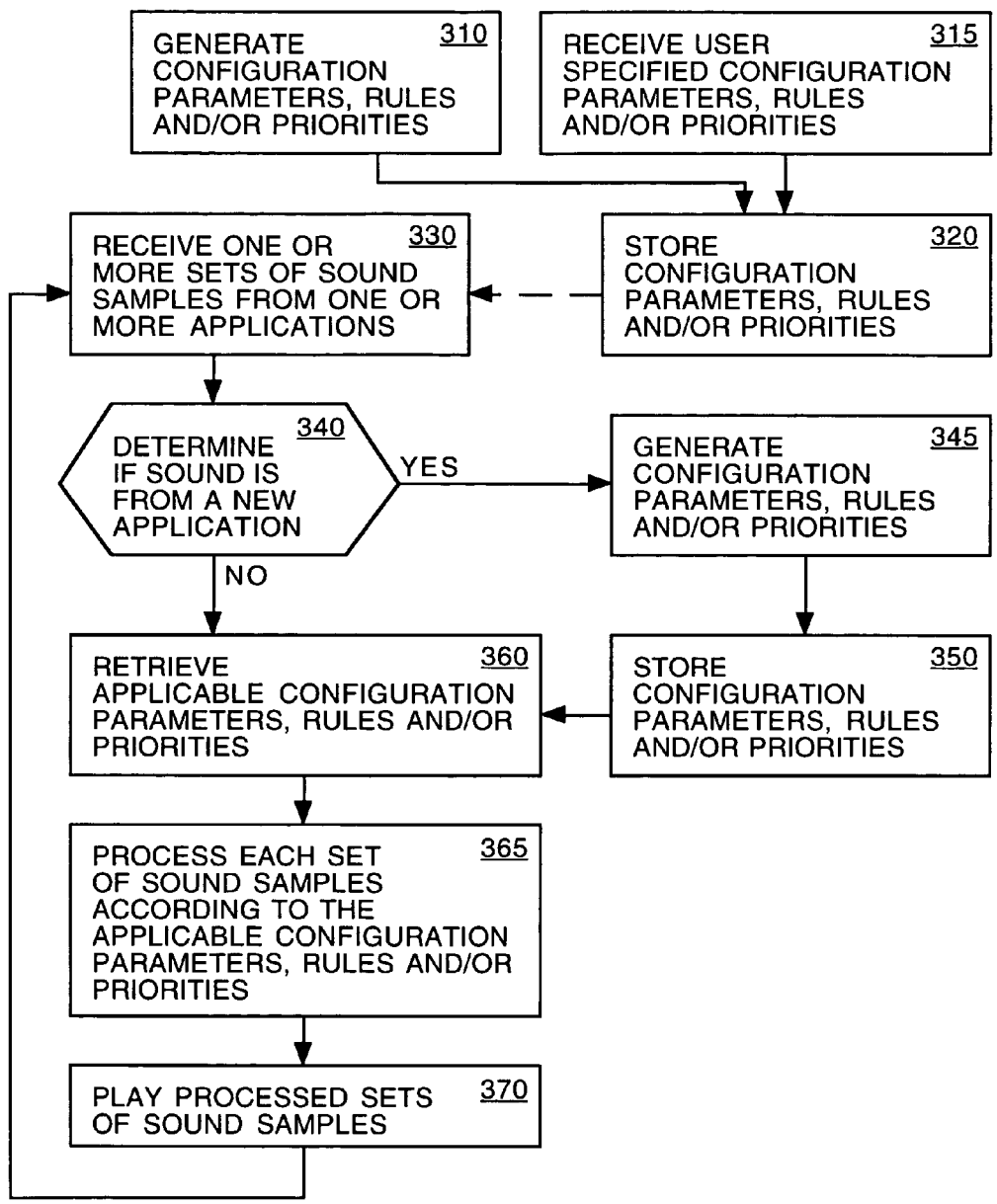
FIG. 3 shows a flow diagram of a computer-implemented method of generating a policy-based audio output, in accordance with embodiments of the present invention.

Referring now to FIG. 3, a flow diagram of a computer-implemented method of generating a policy-based audio output, in accordance with embodiments of the invention, is shown. As depicted in FIG. 3, the method of generating a policy-based audio output includes a means of processing one or more sets of sound samples 330, 360-370, according to applicable configuration parameters, rules and/or priorities. The method may optionally include one or more means of creating configuration parameters, rules and/or priorities 310-320, 340-350.

Optionally at 310, one or more configuration parameters, rules and/or priorities are generated (e.g., default, pre-defined) for one or more corresponding applications and/or events that produce sound. In one embodiment, the configuration parameters, rules and/or priorities are pre-defined, for example by the manufacturer of a policy-based audio system in accordance with embodiment of the invention. In another embodiment, fuzzy logic associates one or more configuration parameters, rules and/or priorities with one or more applications and/or events that make sound, based upon each application's class.

Optionally at 315, one or more configuration parameters, rules and/or priorities are specified, by a user for instance, for one or more corresponding applications and/or events that produce sound. In one embodiment, the user specifies one or more configuration parameters, rules and/or priorities through a graphical user interface, which may be triggered at application initialization and/or upon the first time the application is executed.

It is appreciated that the user specification process 315 may also be utilized to modify the system generated configuration parameters, rules and/or priorities from process 310. It is also appreciated that the processes of system generation 310 and/or user specification 315 may be initiated upon installation of a system for generating a policy-based audio output, upon installation of an application, driver and/or hardware, or upon initiation by the user (e.g., to install or modify configuration parameters, rule and/or priorities).

At 320, if one or more configuration parameters, rules and/or priorities are generated at 310 or specified at 315, the one or more configuration parameters, rules and/or priorities are stored for retrieval and application according to processes 360 and 365. The one or more configuration parameters, rules and/or priorities are stored such that their relationships to the corresponding applications and/or events are maintained.

At 330, one or more sets of sound samples generated by one or more applications and/or events are received. At 360, one or more applicable configuration parameters, rules and/or priorities, for each set of sound samples, are retrieved. All of the stored configuration parameters, rules and/or priorities are queried to determine those that are applicable to a given set of sound samples. At 365, each set of sound samples are processed according to the applicable configuration parameters, rules and/or priorities. The configuration parameters, rules and/or priorities are applied according to the applications and/or events that are generating the sounds. At 370, the sets of sound samples processed according to 365 are played.

Optionally at 340, for each set of sound samples received, it is determined if the sound is from a new application or event. If the sound is generated by an application or event that has not previously produced sound, one or more configurations parameters, rules and/or priorities are generated, at optional process 345. In one embodiment, fuzzy logic associates one or more configuration parameters, rules and/or priorities with the new application or event, based upon the class of the new application. If one or more configuration parameter, rules and/or priorities are generated at 345, the one or more configuration parameters, rules and/or priorities are stored at 350.

Figure 4:
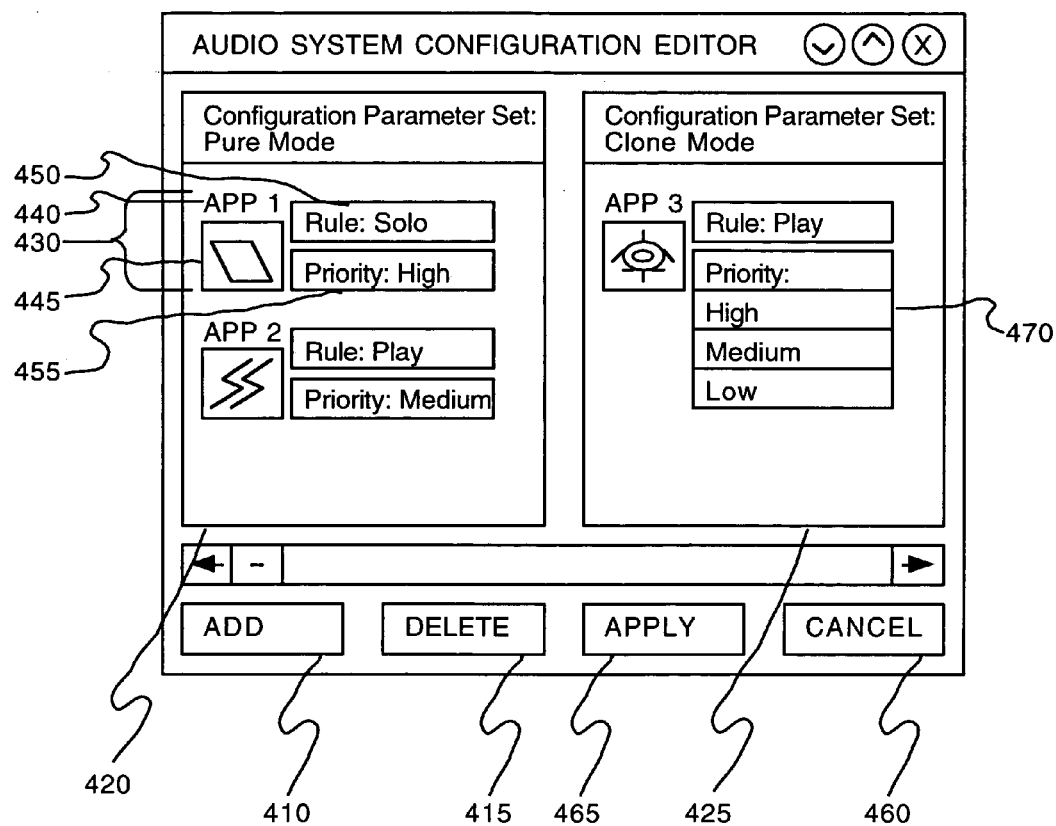
FIG. 4 shows an exemplary on-screen user interface for use with a policy-based audio system, in accordance with one embodiment of the present invention.

Referring now to FIG. 4, an exemplary on-screen user interface for use with a policy-based audio system, in accordance with one embodiment of the invention, is shown. The user interface allows a user to create and/or edit configuration parameters, rules and/or policies associated with one or more applications and/or events. As depicted in FIG. 4, the exemplary user interface may include one or more buttons 410, 415 for adding and deleting applications and/or events to the policy-based audio system. One or more sets of configuration parameters may be displayed 420, 425. Each application 430 or event that is associated with a given set of configuration parameters is displayed in a corresponding configuration identifying area 420. The application 430 or event may be identified by name 440 and/or icon 445. One or more rules associated with a given application or event may be displayed in a rule identifying area 450. One or more priorities associated with the given application or event may be displayed in a priority identifying area 455.

Upon clicking the add button 410, a list of all applications loaded on a given computing device and/or events may be provided in a pop-up dialog box (not shown). Upon selecting a particular application or event, the user may specify one or more configuration parameters. For example, the user may specify that sound from such an application be processed in a pure mode 420 or a clone mode 425. In the pure mode 420, the sound is played in the format generated by the application (e.g., a stereo generated sound is played in a stereo format, and multi-channel generated sound is played in a multi-channel format). In the clone mode 425, the sound is played in a format different from the format generated by the application (e.g., a stereo generated sound is played in a surround sound format by cloning and up-conversion). A user may also be able to drag and drop, right click, arrow move or the like an application or event in one mode (e.g., 420) to another mode (e.g., 425), thereby changing the configuration parameters with respect to that application or event.

The user may also select a particular rule, from a pop-up dialog box (not shown), to be applied to a particular application or event. For example, selecting the rule identifying area 450 may cause the dialog box to pop-up. The dialog box may contain a list of available rules.

The user may also select a priority, from a pop-up dialog box 470, to be applied to the particular application or event. For example, selecting the priority identifying area may cause the dialog box to pop-up 470. The third dialog box 470 may contain a list of available priorities.

An association between a set of configuration parameters, rules and/or priorities may be deleted by click selecting a corresponding display area associated with the given application or event and then clicking the delete button, right clicking or the like. Upon clicking the apply button the configuration parameters, rules and priorities associated with various applications and/or events are stored.

Figure 5:
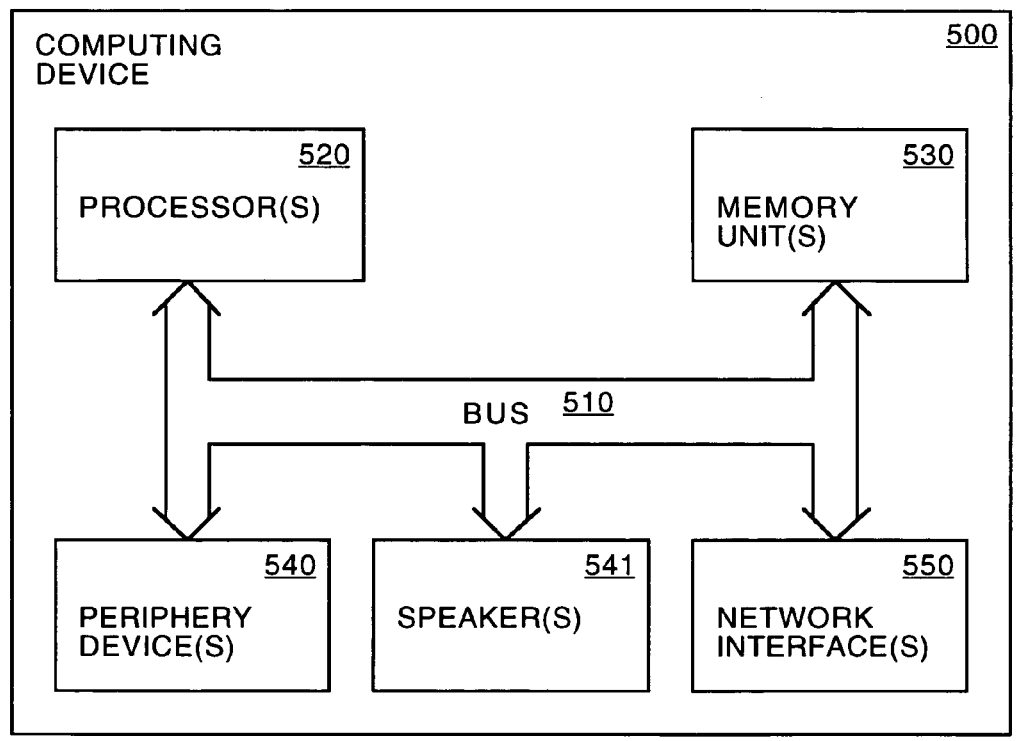
FIG. 5 shows a block diagram of an exemplary computing device for implementing embodiments of the present invention.

Referring now to FIG. 5, a block diagram of an exemplary computing device for implementing embodiments of the invention is shown. The exemplary computing device may be a personal computer, a gaming console, a home entertainment system, a personal digital assistant, a multi-media enabled telephone or the like. As depicted in FIG. 5, the exemplary computing device 500 includes a bus 510 for communication information and instructions. One or more processors 520 are coupled to the bus 510 for processing information and instructions. One or more memory units 530 are also coupled to the bus 510 for storing information and instructions for the processor 520. The memory unit 430 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like.

The computing device 500 also includes one or more peripheral devices 540 (e.g. display, keyboard, pointing device, speaker, and the like) coupled to the bus 510. At least one of the periphery devices 540 is a speaker 541, a soundcard, videocard or the like. Optionally, the computing device 500 may include one or more network interfaces 550 coupled to the bus 510. The network interfaces 550 provides for communicating with other computing devices across a communication channel.

Certain processes and steps of the present invention are realized as a series of instructions (e.g. code) that reside on a computing device-readable medium such as the memory unit 430, and are executed by the processor 520. When executed, the instructions cause the processor 520 to provide an operating system, one or more application programs, a sound application programming interface (API), a speaker driver, a configuration module and an audio system database. It is appreciated that a policy manager may be provided as an independent program routine or an integral part of the speaker driver or the configuration module.

One or more application programs generate sounds and/or the operating system generates events, which are processed by the sound API, speaker driver, policy manager configuration module and audio system database to generate a policy-based audio output. The policy-based audio output may be played on the speakers 441 or the like.

In a networked embodiment of the invention, the policy manager and audio database may be provided by a series of instruction that reside on the computing device-readable medium of a first computing device. The one or more application programs, the sound API and the speaker driver may be provided by a series of instruction that reside on the computing device-readable medium of a second computing device. Accordingly, the policy manager and audio database of the first computing device may provide for remote administration of the generation of policy-based audio output by the second computing device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computing device implemented method of generating a policy-based audio output comprising:
   receiving a first set of sound samples from a first application or event;
   receiving a second set of sound samples from a second application or event;
   determining if the second application or event has not previously generated sound;
   receiving from a user a policy including one or more of a group consisting of a configuration parameter, a rule and a priority applicable to the second application or event in response to determining that the second application or event has not previously generated sound;
   storing the received policy applicable to the second application or event such that it is associated with the second application or event in an audio system database;
   accessing a policy associated with the first application or event and the policy associated with the second application or event stored in the audio system database;
   processing the first set of sound samples relative to the second set of sound samples according to the accessed policy associated with the first application or event and the accessed policy associated with the second application or event to distinguish between the first and second set of sound samples when all or part of the first set of sound samples are to be rendered during the second set of sound samples; and
   rendering the processed first set of sound samples and the second set of sound samples.

2. The method according to claim 1, further comprising:
   generating one or more of a group consisting of a configuration parameter, a rule and a priority applicable to the first application or event; and
   storing said one or more of said configuration parameter, said rule and said priority such that it is associated with said first application oi event in the audio system database.

3. The method according to claim 2, wherein said one or more of said configuration parameters, said rule or said priority is associated by fuzzy logic.

4. A non-transitory computing device-readable medium containing instructions which when executed cause a computing device to implement a policy-based audio system comprising:
   a sound application protocol interface for receiving a first set of sound samples generated by a first application or event and receiving a second set of sound samples generated by a second application or event;
   a configuration module for determining if the second a application or event has not previously generated sound, for receiving from a user a respective group of one or more parameters, rules and priorities applicable to the second application or event, for storing the received group of one or more parameters, rules and priorities applicable to the second application or event applicable to the second application or event in an audio system database, for retrieving a first group of one or more parameters, rules and priorities applicable to said first application or event stored in the audio system database and retrieving a second group of one or more parameters, rules and priorities applicable to said second application or event stored in the audio system database; and
   a speaker driver for producing an audio output processed as a function of said first group of one or more configuration parameters, rules and priorities and said first set of sound samples relative to said second group of one or more configuration parameters, rules and priorities and said second set of sound samples to distinguish between the first and second set of sound samples when all or part of said first set of sound samples are rendered during said second set of sound samples.

5. The non-transitory computing device-readable medium according to claim 4, wherein a volume of said first portion of said audio output is ducked with respect to said second portion of said audio output.

6. The non-transitory computing device-readable medium according to claim 4, wherein said first set of sound samples is played, muted or soloed as a function of a rule from said first group of configuration parameters, rules and priorities.

7. The non-transitory computing device-readable medium according to claim 4, wherein said first set of sound samples is automatically converted from a first format to a second format as a function of one or more configuration parameters from said first group of configuration parameters, rules and priorities.

\* \* \* \* \*